United States Patent [19]
Tumlinson

[11] 3,917,134
[45] Nov. 4, 1975

[54] PERSONAL FISHING CARRIER

[76] Inventor: Alvin L. Tumlinson, 2202 Rountree Drive, Austin, Tex. 78722

[22] Filed: Dec. 6, 1974

[21] Appl. No.: 530,239

[52] U.S. Cl. ............... 224/5 E; 224/5 G; 224/25 R
[51] Int. Cl.² ........................................... A45F 5/00
[58] Field of Search ........ 224/5 E, 5 G, 25 R, 25 A, 224/5 R, 5 B, 26 R, 7 R; 43/54.5; D31/4

[56] References Cited
UNITED STATES PATENTS

| | | | |
|---|---|---|---|
| 1,198,202 | 9/1916 | Drinkard | 224/5 E |
| 2,576,624 | 11/1951 | Miller | 224/5 E UX |
| 3,277,599 | 10/1966 | Griffeth | 224/5 G X |
| 3,317,097 | 5/1967 | Giordano | 224/5 G |

Primary Examiner—Robert J. Spar
Assistant Examiner—Jerold M. Forsberg
Attorney, Agent, or Firm—Peter J. Murphy

[57] ABSTRACT

A generally arcuate tray to be worn about the waist of the fisherman, and secured about the waist by means of an adjustable belt. The tray provides three upward opening compartments, the two end compartments having hinged covers for protection against the elements. The tray includes an apron plate, defining a portion of the arcuate inner wall, which bears against the fisherman's body and supports the carrier in the desired use orientation. A principal accessory is a forwardly extending fishing rod socket, connected to the apron plate and to the underside of the tray, to support a fishing rod while changing lures or bait for example. Other accessories are a drink holder and a flashlight holder.

7 Claims, 6 Drawing Figures

PERSONAL FISHING CARRIER

BACKGROUND AND SUMMARY OF THE INVENTION

This invention relates to a convenience carrier for fishing tackle and accessories, adapted to be worn conveniently about the waist of the user.

A principal object of this invention is to provide a personal carrier to be worn by a fisherman, for carrying desired tackle and accessories while moving about in a stream or from place to place on the banks of a stream or other body of water, and which will not interfere with the fisherman's arms with respect to casting or other necessary activities.

Another object of this invention is to provide such a carrier having both closed compartments for protecting tackle against the elements, and open compartments for convenience, and which is adapted for carrying such articles as lures, flies, bait, extra reels, tools etc.

A further object of this invention is to provide such a carrier including convenient means for supporting a fishing rod during such activities as changing lures, and repairing or changing reels, for example.

Still another object of this invention is to provide such a carrier having external accessories in addition to the compartments for carrying other articles.

A still further object of this invention is to provide such a carrier providing maximum convenience for the user and minimum interference with normal fishing activities.

These objects are accomplished in a fishing carrier which consists of an elongated generally arcuate body having a generally arcuate inner wall, with the body providing a plurality of upward opening compartments for the storage of fishing tackle and accessories. Means are provided for securing the body at the waist of the user with the inner wall adjacent to the user's body. An apron plate is secured to the carrier body, extending downwardly therefrom and coinciding with at least a portion of the inner wall, for supporting the carrier body in a generally horizontal orientation when worn by the user. The carrier includes elongated socket means secured under the body extending transversely and generally horizontally to receive and support a fishing rod.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
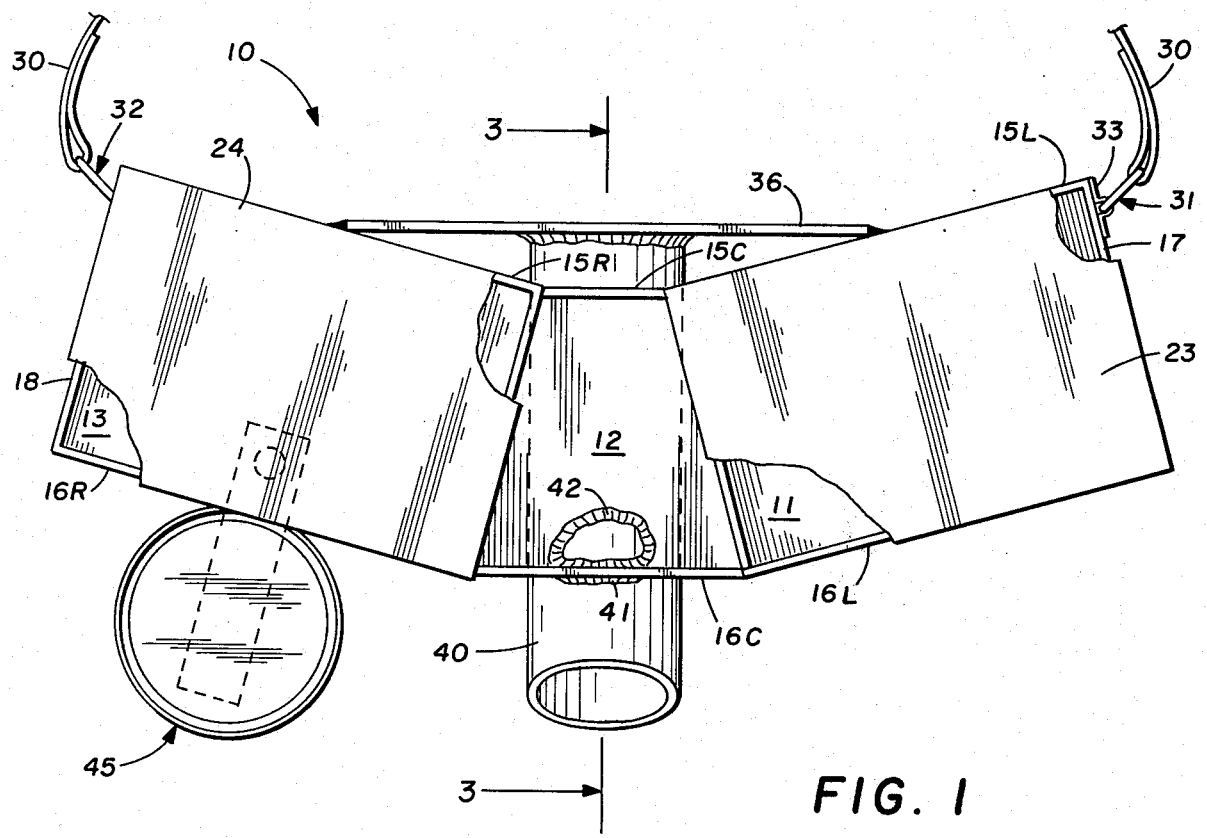
FIG. 1 is a top view of a fishing carrier according to the invention.

Referring to the drawings, a preferred form of fishing carrier according to the invention consists generally of an arcuate body or tray 10 adapted to be worn about the waist of the fisherman, and defining left hand and right hand covered compartments 11 and 13 respectively separated by an uncovered central compartment 12.

The body includes a generally arcuate bottom wall 14, which defines the bottom wall for all compartments, generally arcuate inner and outer walls 15 and 16 respectively, end walls 17 and 18, and interior partition walls 19 and 20. The inner and outer walls are arcuate in the sense that they are made up of planar segments angled with respect to each other; and each arcuate wall includes a central segment designated by the reference number subscript C, which would normally be disposed in a plane generally parallel to the user's body, and left and right segments designated by the reference number subscripts L and R respectively, which are angled rearwardly from the central segments.

It will be seen then that the left compartment 11 is formed by the walls 15L, 16L, 17 and 19, and that the right compartment 13 is formed by the walls 15R, 16R, 18 and 20, these walls in each case forming a rectangular box with the floor plate 14. The central wall segments 15C and 16C are lower than the adjacent wall segments and form, with the partition walls 19 and 20, an open topped, trapezoid shaped central compartment 12.

Figure 2:
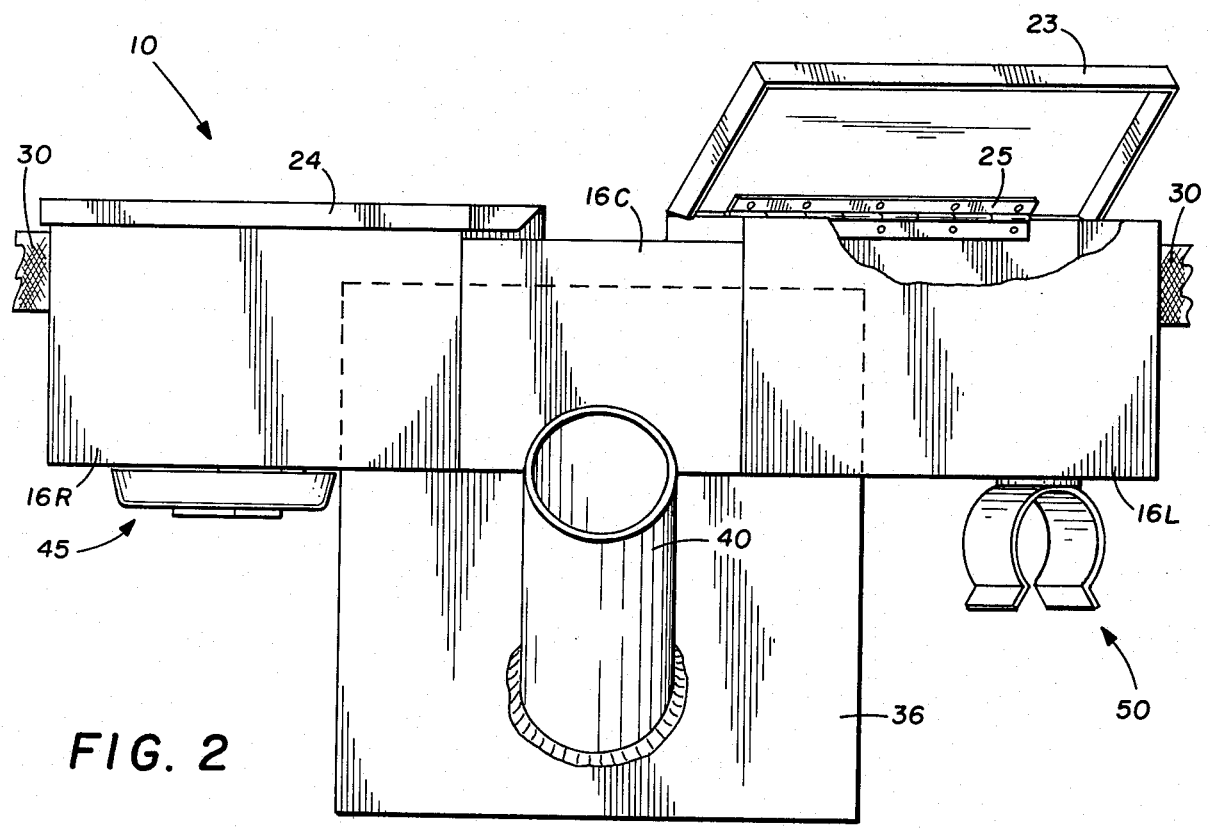
FIG. 2 is a front view of the carrier of FIG. 1, with one cover partially open.

The end compartments 11 and 13 are provided with respective covers 23 and 24 which are secured to the respective inner walls by suitable hinges 25. As seen in the drawings, these covers are provided with downturned flanges on the front and sides to protect the compartments from the elements. The cover 23 is shown partially opened in FIG. 2.

By way of example, the above described carrier body may be dimensioned to provide the covered compartments 11 and 13 having an end-to-end length of about 6 inches, a front-to-rear width of about 4 inches, and a depth of about 3 ½ inches, with the overall length of the carrier body being about 13 ½ inches across the inner wall and having a maximum length of about 16 inches.

Figure 6:
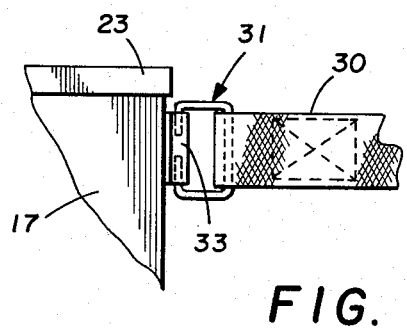
FIG. 6 is a detail view of a belt attaching ring for the carrier.

As mentioned, the carrier is designed to be supported about the waist of a fisherman; and for this purpose a suitable belt 30 may be attached to the body by means of belt rings 31 and 32 secured to the end walls 17 and 18 respectively. As best seen in FIG. 6, a belt ring 31 for example may be rectangular in shape being mounted in a pivot bracket 33 secured in any suitable manner to the body wall. The belt 30 is preferably an adjustable belt and may, for example, be a conventional belt which is merely passed through the rings 31 and 32 with both runs passing behind the body of the user.

The carrier, then, is normally supported in the horizontal orientation illustrated in the drawing; and, for the purpose of stabilizing the carrier relative to the user's body, an apron plate 36 is secured to the inner wall 15. This apron plate consists of a flat rectangular plate, secured at its ends in any suitable manner to the left and right wall segments 15L and 15R, and disposed in parallel spaced relation to the central wall segment 15C. This plate extends downward from the carrier body to a total depth of approximately 8 inches from the top of the body, for example, to bear against the user's body. As best seen in FIG. 1 the apron plate defines, with portions of the wall segments 15L and 15R, an overall generally arcuate bearing wall for bearing against the user's body.

Figure 3:
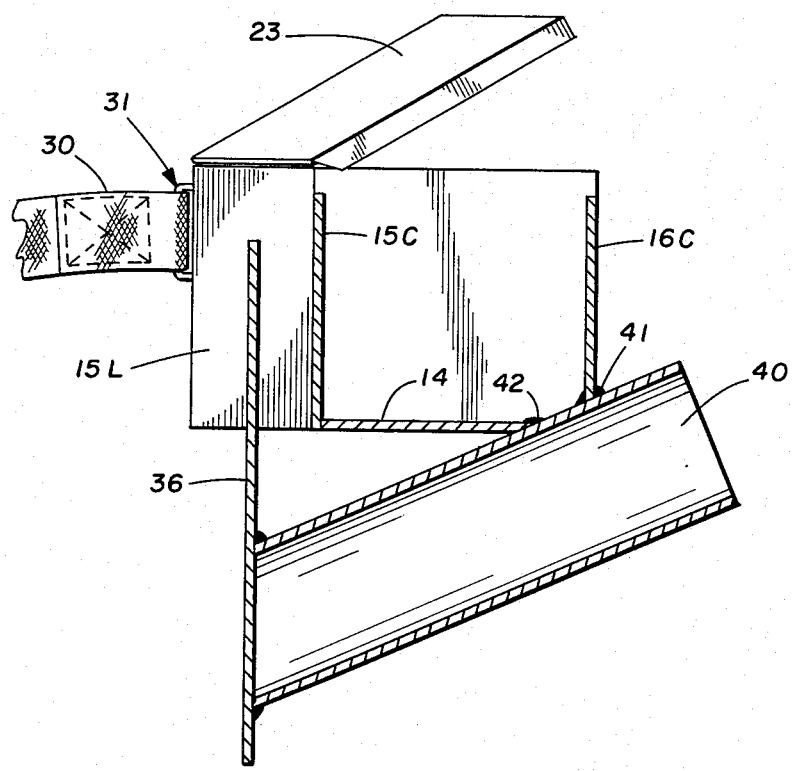
FIG. 3 is a transverse sectional view, taken in the plane 3—3 of FIG. 1.

An important accessory of the carrier is a fishing rod socket 40 consisting of a 2 inch diameter cylindrical sleeve for example, mounted under the body, extending forwardly and being upwardly inclined from rear to front. As best seen in FIG. 3 the rearward end of the sleeve 40 is secured to, and closed by, the apron plate 36; and the forward end of the sleeve is secured in recesses 41 and 42 provided in the front wall portion 16C and the bottom wall 14, respectively, and the sleeve extends forwardly from the front wall. The drawing illustrates welds for securing the sleeve to the supporting members. This socket may have a length of about 7 inches, for example, to receive and provide adequate support for the handle of a fishing rod; and the stabilization of the carrier by the apron plate 36 is particularly important in connection with the support of a fishing rod in this socket.

Figure 4:
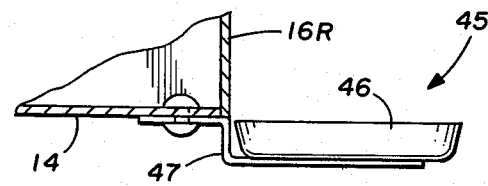
FIG. 4 is a detail view of the drink holding accessory.

Another carrier accessory is a drink holder 45, illustrated in detail in FIG. 4, consisting of a shallow circular tray or cup 46 dimensioned to accommodate a drinking cup, can or other beverage container. The tray 46 is fixed to a Z-shaped bracket 47 which is pivotally attached to the underside of the bottom wall 14, in a manner that the holder can be pivoted out of the way and under the compartment 13 when not in use.

Figure 5:
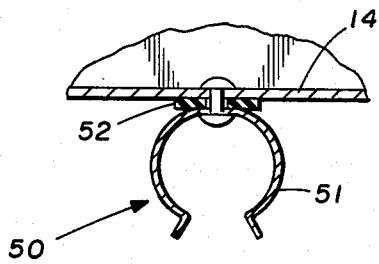
FIG. 5 is a detail view of the flashlight clip accessory.

Another accessory is a flashlight holder 50 which is pivotally secured to the bottom wall 14 under the compartment 11. This holder 50, as best seen in FIG. 5, consists of a generally C-shaped spring clip 51 pivotally attached to the plate 14 by means of a rivet for example and having a rubber-like washer 52 disposed between the clip and plate. This washer is preferably compressed during assembly so that it exerts some frictional resistance to turning of the spring clip, thereby enabling the positioning of a flashlight to direct a light generally forwardly if desired, or to turn the flashlight lengthwise with the carrier body to protect it from being dislodged when not in use.

In the drawings all of the above described parts of the carrier are illustrated as metal parts; and, assuming that the carrier is fabricated from a suitable lightweight metal, the parts may be secured together by means of welding or brazing for example. It is to be understood however that the carrier may be fabricated as well from suitable plastic materials or other material having a desired characteristics of strength and durability.

What has been described is a personal fishing carrier to be worn by the fisherman, and which is very convenient in having means for fitting the carrier in a secure and stable manner about the waist of the fisherman where it is most convenient for use, and in a manner that it will not interfere with his arms or with normal fishing activities such as casting. The carrier has convenient compartments, some of which are closed to provide desired protection of the contents from the elements, and one of which is open for convenient access without the necessity of lifting a cover.

A particular feature of the carrier is the socket for holding a fishing rod while the user may be engaged in such activities as baiting, changing a lure, repairing a broken line, and changing or repairing a reel etc. This, of course, is particularly desirable where the fisherman is in the water and does not have any convenient way to support the rod while performing such activities. An ancillary feature is the structure of the rod holding socket in association with the apron plate, to provide stability of the carrier when used for the rod holding function.

Other features of the carrier are the flashlight holder and drink holder accessories, and particularly the flashlight holder which may be used to direct a supported flashlight in a desired direction or to store the flashlight in a secured out of the way position for emergency use.

While the preferred embodiment of the invention has been illustrated and described, it will be understood by those skilled in the art that changes and modifications may be resorted to without departing from the spirit and scope of the invention.

What is claimed is:

1. A fishing carrier comprising
an elongated body substantially conforming to a wearer's body, having a generally arcuate inner wall to bear against the wearer's body; said body providing a plurality of upward opening compartments for the storage of fishing tackle and accessories;
means on said body for securing same at the waist of the wearer;
an apron plate secured to said carrier body centrally of said inner wall and depending therebelow, to bear against the wearer's body for supporting said carrier body in a generally horizontal orientation;
means secured to the underside of said carrier body defining an elongated socket, extending in an inclined attitude generally upwardly and away from the wearer to receive and support a fishing rod;
and said socket means being mounted centrally of said carrier body and being secured at its rearward end to said apron plate.

2. A carrier as set forth in claim 1
said carrier body defining at least two compartments; and a flanged cover hingedly attached to said body for closing the top of at least one compartment for protection against the elements.

3. A carrier as set forth in claim 1
said carrier body defining a central compartment and two end compartments each having a depth of about 3 ½ inches and a front to rear width of about 4 inches; said end compartments being rectangular in shape and having a length of about 6 inches;
and each of said end compartments having a flanged cover hingedly attached to said body.

4. A carrier as set forth in claim 1 said inner wall comprising a central portion and end portions: said apron plate comprising a flat plate secured centrally of said inner wall, bridging the central portion of said inner wall and being spaced therefrom, and defining with the end portions of said inner wall a generally arcuate bearing wall to bear against the wearer's body.

5. A carrier as set forth in claim 1
said socket means being substantially longer than the front-to-rear width of said carrier body and being upwardly inclined from rear to front; said socket means being anchored at its rearward end to said apron plate, and being anchored adjacent to its forward end to said body adjacent to its front wall.

6. A carrier as set forth in claim 1
spring clip means pivotally secured to a bottom wall of said carrier body, about a generally vertical axis; said spring clip means being dimensioned for supporting a flashlight, and being pivotable to enable the directing of the beam of the flashlight in a desired direction.

7. A carrier as set forth in claim 1 holder means for a beverage container secured to said carrier body adjacent to an outer wall thereof.

* * * * *